(12) United States Patent
Fan et al.

(10) Patent No.: US 10,552,812 B2
(45) Date of Patent: *Feb. 4, 2020

(54) SCENARIO BASED LOGGING (71) Applicant: International Business Machines Corporation, Armonk, NY (US)

(72) Inventors: Si Bin Fan, Beijing (CN); Xiao Feng Guan, Shanghai (CN); You Peng Huang, Beijing (CN); Zhao Juan Li, Beijing (CN); Rong Xiang, Beijing (CN); Rong Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/840,013

(22) Filed: Dec. 13, 2017

(65) Prior Publication Data
US 2018/0101307 A1    Apr. 12, 2018

Related U.S. Application Data

(63) Continuation of application No. 15/193,222, filed on Jun. 27, 2016.

(51) Int. Cl.
*G06Q 20/10* (2012.01)
*G06Q 20/40* (2012.01)
(52) U.S. Cl.
CPC .............................. *G06Q 20/1085* (2013.01)
(58) Field of Classification Search
CPC .... G06F 11/362; G06F 11/3608; G06F 3/067; G06F 3/0605; G06F 3/06659; G06F 3/061; G06F 3/0608; G06F 3/0673; G06Q 20/405; G06Q 20/1085
USPC .................................................. 717/124–135
See application file for complete search history.

(56) References Cited

U.S. PATENT DOCUMENTS

| | | | |
|---|---|---|---|
| 7,818,341 B2 | 10/2010 | Kurien et al. | |
| 9,122,795 B1 | 9/2015 | Daudel et al. | |
| 9,201,776 B1 * | 12/2015 | Cohen | G06F 9/44589 |
| 9,239,777 B1 * | 1/2016 | Cohen | G06F 11/3684 |
| 9,317,404 B1 * | 4/2016 | Cohen | G06F 11/3684 |
| 9,317,412 B1 * | 4/2016 | Cohen | G06F 11/3688 |
| 9,348,735 B1 * | 5/2016 | Cohen | G06F 11/3684 |
| 9,552,274 B2 | 1/2017 | Balachandran | |
| 2003/0131283 A1 * | 7/2003 | Ur | G06F 11/3632 714/36 |

(Continued)

OTHER PUBLICATIONS

Anonymous, "A method and apparatus of generating customized business logs on demand," An IP.com Prior Art Database Technical Disclosure, IP.com No. IPCOM000219960D, Jul. 18, 2012, pp. 1-17. http://ip.com/IPCOM/000219960.

(Continued)

*Primary Examiner* — Marina Lee
(74) *Attorney, Agent, or Firm* — Jorge R. Maranto (57) ABSTRACT

This disclosure provides a computer implemented method comprising: determining whether an input to a program matches a predetermined scenario; and recording, at least partially in response to the determination that the input matches the predetermined scenario, execution information of execution of at least part of the program, the execution of the at least part of the program being in response to the input.

6 Claims, 6 Drawing Sheets

(56) References Cited

U.S. PATENT DOCUMENTS

| | | | | |
|---|---|---|---|---|
| 2005/0188271 | A1* | 8/2005 | West | G06F 11/3684 |
| | | | | 714/38.1 |
| 2007/0240118 | A1* | 10/2007 | Keren | G06F 11/3684 |
| | | | | 717/124 |
| 2008/0243848 | A1* | 10/2008 | Vedula | G06F 17/30867 |
| 2009/0037894 | A1 | 2/2009 | Unger | |
| 2011/0023019 | A1* | 1/2011 | Aniszczyk | G06F 9/445 |
| | | | | 717/128 |
| 2011/0231820 | A1* | 9/2011 | Upadhyaya | G06F 8/423 |
| | | | | 717/124 |
| 2012/0036397 | A1* | 2/2012 | Balani | G06F 11/079 |
| | | | | 714/38.11 |
| 2012/0304172 | A1* | 11/2012 | Greifeneder | G06F 9/45504 |
| | | | | 718/1 |
| 2014/0149576 | A1* | 5/2014 | Pavlov | G06F 11/302 |
| | | | | 709/224 |
| 2014/0279918 | A1* | 9/2014 | Han | G06F 11/366 |
| | | | | 707/648 |
| 2015/0261660 | A1* | 9/2015 | Shiraishi | G06F 11/3688 |
| | | | | 714/38.1 |
| 2017/0161171 | A1* | 6/2017 | Batzdorff | G06F 11/3624 |
| 2017/0371552 | A1* | 12/2017 | Fan | G06F 3/0605 |
| 2018/0101307 | A1* | 4/2018 | Fan | G06Q 20/405 |

OTHER PUBLICATIONS

Fan et al., "Scenario Based Logging," U.S. Appl. No. 15/193,222, filed Jun. 27, 2016.

List of IBM Patents or Patent Applications Treated as Related, Signed Dec. 13, 2017, 2 pages.

* cited by examiner

SCENARIO BASED LOGGING

BACKGROUND

The present invention relates to the field of software development, and more specifically, to a computer-implemented method, a system and a computer program product for logging.

In current work of software development, logs of programs are important for debugging and analyzing the programs. A "log" of a program herein means execution information recorded during execution of the program, and the recording of the execution information may be referred to as "logging".

A program may have a plurality of points of execution, and execution information may be recorded for each of the points of execution. During debugging of the program, a developer or a tester might not want to obtain the execution information for all the points of execution. Currently, selectively obtaining execution information is mainly implemented based on level definition, in which logs may be categorized into different levels according to how serious the execution information contained in the log may be, and each logging is enabled or disabled by deciding logs of which level or levels the developer or the tester would like to obtain.

SUMMARY

According to an aspect of the present disclosure, there is provided a computer implemented method that determines whether an input to a program matches a predetermined scenario. The method records, at least partially in response to the determination that the input matches the predetermined scenario, execution information of execution of at least part of the program. The execution of the at least part of the program is in response to the input.

According to another aspect of the present invention, there is provided a system comprising, one or more processors; a memory coupled to at least one of the one or more processors, and a set of computer program instructions. The set of computer program instructions is stored in the memory and executed by at least one of the one or more processors in order to perform actions. The instructions determine whether an input to a program matches a predetermined scenario. The instructions record, at least partially in response to the determination that the input matches the predetermined scenario, execution information of execution of at least part of the program. The execution of the at least part of the program is in response to the input.

According to another aspect of the present invention, there is provided a computer program product for a distributed computation system, the computer program product comprising a computer readable storage medium having program instructions embodied therewith. The program instructions are executable by a device to perform a method. The method determines whether an input to a program matches a predetermined scenario. The method records, at least partially in response to the determination that the input matches the predetermined scenario, execution information of execution of at least part of the program. The execution of the at least part of the program is in response to the input.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
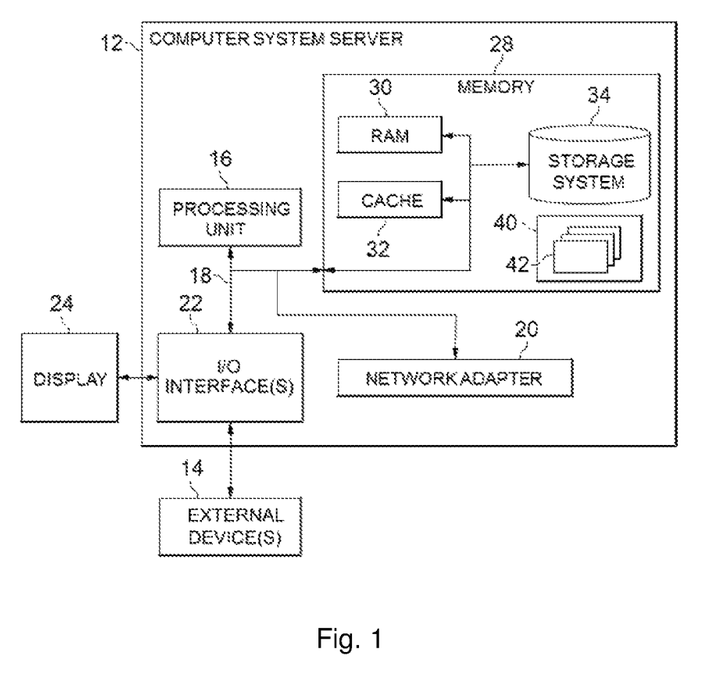
FIG. 1 shows an exemplary computer system which is applicable to implement the embodiments of the present disclosure.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
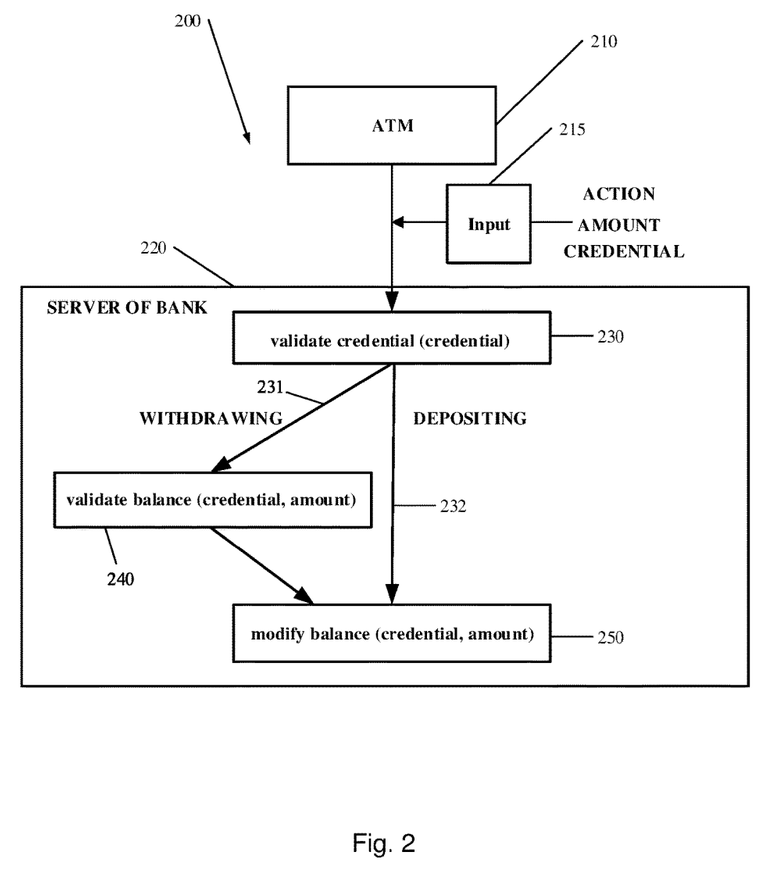
FIG. 2 shows an example of an application in which the implementations of the present disclosure may be applied.

With reference now to FIG. 2, an example of an application 200 in which the implementations of the present disclosure may be applied will be described.

FIG. 2 shows an example of an application 200 that can be implemented in a server 220 of a bank. In this example an input 215 received by an automatic teller machine (ATM), or other input device such as, for example, a mobile phone, is transmitted to the server 220 of the bank. Processing will be executed at the server 220 in response to the input 215. In this example, the input 215 may comprise an action (for example, withdrawing or depositing), an amount of bank notes, checks or other depositable or withdrawable instrument, related to the action (for example, the amount to be withdrawn from or deposited to the ATM), and a credential (for example, an account number and a password of a bank account).

As shown in FIG. 2, the processing at the server 220 may comprise execution of a function 230 "validate credential" for validating a credential (the parameter of which includes a credential). Then, depending on whether the action indicates withdrawing or depositing, the processing will proceed differently. Withdrawing follows path 231 while depositing follows path 232. The processing in the case of withdrawing may further comprise, for example, a function 240 "validate balance" for checking whether the amount to be withdrawn exceeds the balance related to the credential (the parameters of which include a credential and an amount). In both cases of withdrawing and depositing, the processing may further comprise a function 250 "modify balance" for modifying the balance after withdrawing or depositing (the parameter of which includes a credential and an amount) to reflect the amount of the transaction.

There may be points of execution in the above processing at which one or more logging functions are provided to record execution information as one or more logs. A "point of execution" may mean the execution until a certain line of the source code. Each of the logs of the points of execution may be assigned with a level indicating how important the execution information reflected by the log may be. For example, logs in the functions "validate credential" and "validate balance" may have a higher level of 2, and logs in the function "modify balance" may have a lower level of 1. In this way, a user such as a developer or a tester is able to selectively enable or disable the operation of the logging functions only according to the levels of the logs.

However, such a way of logging based on levels is limited and might be insufficient. For example, the user may want to obtain logs only for a case of withdrawing instead of depositing. As another example, the user may want to obtain logs only for credentials which indicate VIP clients. In some cases, selective logging based merely on such levels may incur a large amount of data which may contain noises, and the user may have to manually filter out the undesired logs. On the other hand, some desired logs may be missed by using selective logging based merely on such levels.

Figure 3:
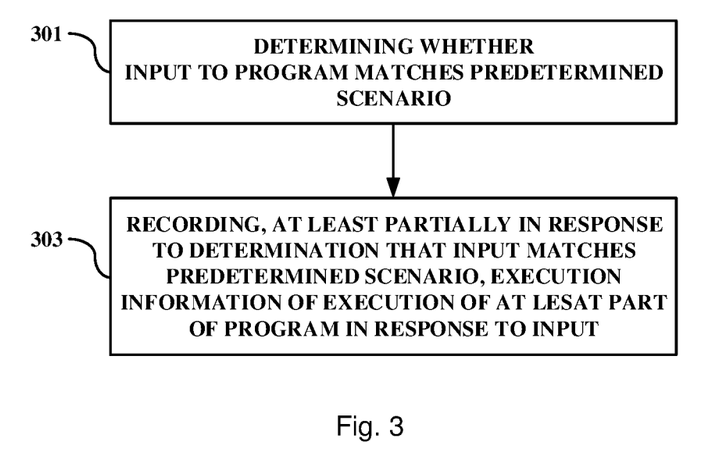
FIG. 3 is a flowchart illustrating a computer-implemented method according to an exemplary implementation of the present disclosure.

With regards to this, the present disclosure proposes a computer-implemented method, an exemplary implementation of which is illustrated in FIG. 3.

As shown in FIG. 3, the method according to the exemplary implementation may comprise a step 301 of determining whether an input to a program matches a predetermined scenario, and a step 303 of recording, at least partially in response to the determination that the input matches the predetermined scenario, execution information of execution of at least part of the program, wherein said execution of the at least part of the program is in response to the input. The method shown in FIG. 3 may be performed, for example, each time an input is received.

The term "program" herein may mean a set of codes implementing a certain computation logic, and may be, for example, a program that can run independently from other programs (to be referred to as a "complete program"), a combination of multiple complete programs, a part of a complete program, or a program that can run only in cooperation with another program. For example, the program may be a function, a subroutine, or a set of any one or more program statements. The program does not necessarily include all codes contained in a file or a function, but can comprise only several lines of codes in a file or a function. The program may be executed in a single thread or multiple threads. The term "at least part of the program" may mean a subset of the program including one or more lines of codes, and execution of at least part of the program may be referred to as a certain "processing" of the program. Different processing herein may mean executions of different parts of the program. Different parts of the program may be executed in a same thread or in different threads.

The input to the program may be a parameter or a variable of the program, and may be an input directly received from a user or an output from one or more other programs. According to an exemplary implementation, the input to the program may be a user request. According to another exemplary implementation, the program may be a part of a function, and the input to the program may be an execution result of a preceding part of the same function. According to another exemplary implementation, the program may be at least a part of a function, and the input to the program may be an execution result of another function.

The input may comprise one or more elements. For the example as shown in FIG. 2, the action, the credential and the amount may be deemed as three elements of the input. A scenario may be an application situation decided by the input, and a predetermined scenario may be a condition related to an element of the input or a combination of any two or more of the elements of the input. If the elements of the input comply with such a condition, it may be considered that the input matches the predetermined scenario. It is also possible that multiple parallel scenarios are predetermined, and it may be considered that the input matches the predetermined scenario as long as the input matches any of the multiple parallel predetermined scenarios. According to an exemplary implementation, the predetermined scenario may be defined by a user such as a developer or a tester. For example, the program may provide a user interface, which enables the developer to define the predetermined scenario.

According to an exemplary implementation, the execution of the at least part of the program may comprise one or more points of execution. The execution information may comprise one or more execution statuses (for example, recorded as logs) of the execution, and may include, for example, a value of an intermediate variable (e.g. an input and/or output of an operation or a function), an indication of which branch the program has reached, an occurrence of an error or a warning, and/or the like. The execution information may also comprise the name of the function for which the execution information is recorded, the line number of the program at which the execution information is recorded, the point of time at which the execution information is recorded, and/or the like. The recording of the execution information may be referred to as logging of the one or more execution statuses. According to an exemplary implementation, the execution information such as logs that has been recorded may be output to and stored in a memory, and may, for example, be stored in one or more log files in a storage. Such files may be retrieved later by the user for analysis of the execution.

Following the example as shown in FIG. 2, presuming that the predetermined scenario is that the action indicates withdrawing and the amount is larger than 5000, in the step 301, it is determined whether an action included in an input is withdrawing and whether the amount is larger than 5000. If the action included in the input is withdrawing and the amount is, for example, 10000, then it is determined that the input matches the predetermined scenario. Then in the step 303, execution information of execution in response to the input (for example, the execution information of execution of the functions "validate credential", "validate balance" and "modify balance") may be recorded. Otherwise, if the action included in the input is withdrawing but the amount is, for example, 3,000, then it is determined that the input does not match the predetermined scenario. Then in the step 303, execution information of execution in response to the input will not be recorded.

Although an example of handling an input received from an ATM by a server of a bank has been described for illustrating the exemplary implementations of the present disclosure, the type of the program is in no way limited thereto. For example, the program may be a game application, and a predetermined scenario may be that the user selects a "hard mode". As another example, the program may be a photographing program, and the scenario may be that the flashlight is turned on. The skilled in the art know that the exemplary implementations of the present disclosure may be used in any type of programs as long as there is an input to the program. These examples are only for the purpose of facilitating understanding of the exemplary implementation, and are in no way intended to limit the scope of the invention.

According to an exemplary implementation, the processing (i.e. execution of the at least part of the program) is executed in a thread, and the step 303 may comprise registering, at least partially in response to the determination that the input matches the predetermined scenario, a thread identifier of the thread in which the processing is executed, and recording, at least partially in response to the determination that the thread identifier of the thread has been registered, the execution information of the processing.

Figure 4:
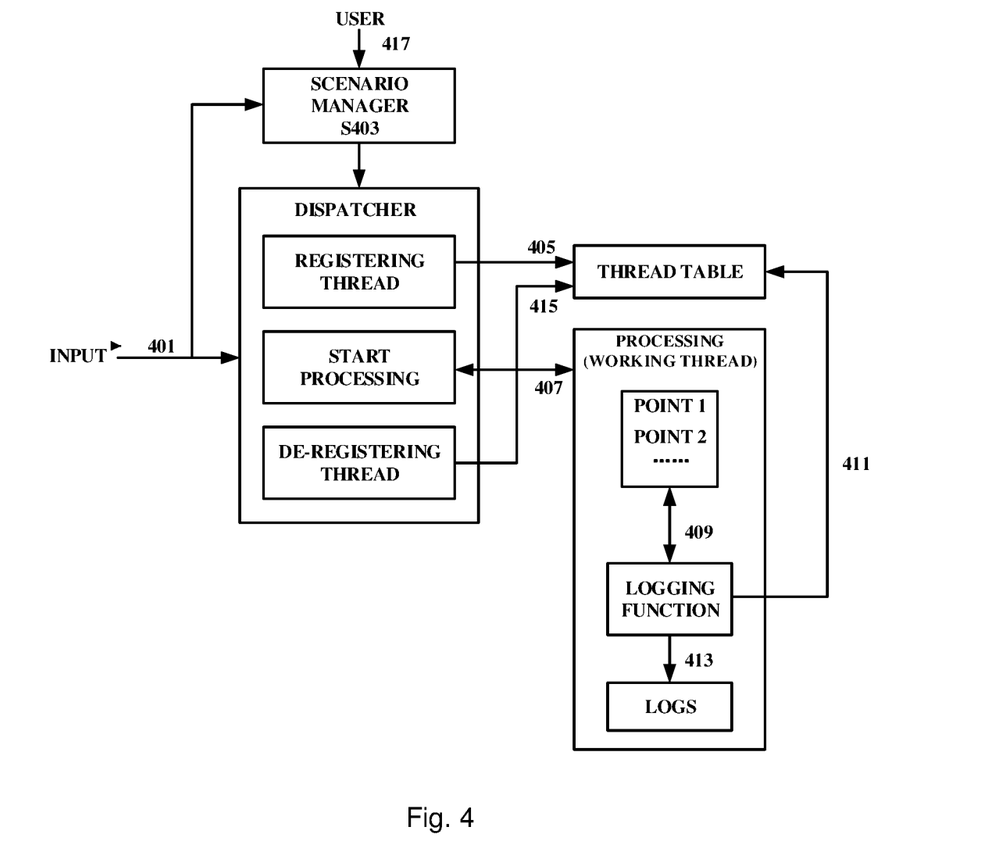
FIG. 4 is a schematic view illustrating an example of an exemplary implementation of the method according to the exemplary implementation of the present disclosure.

An example of the exemplary implementation will be described with reference to a schematic view of FIG. 4 which illustrates the example of the exemplary implementation. It is to be noted that the example described with reference to FIG. 4 is only for the purpose of facilitating understanding of the exemplary implementation, and intends in no way to limit the scope of the invention. In FIG. 4, the whole operation as shown may correspond to a program, and the "processing" as shown may correspond to execution of at least part of the program.

In a step 401, an input is received by a dispatcher of the program. The dispatcher may be a dispatcher program which receives inputs to the program. According to an exemplary implementation, the dispatcher may be executed in a predetermined thread. The dispatcher may be configured to determine a working thread for execution of the processing in response to the input. The working thread may be an already existing thread or may be a thread newly established for the processing. The thread of the dispatcher may be the same as the working thread or may be a different thread from the working thread.

The input is also received by a scenario manager which maintains a definition of a predetermined scenario and determines, in the step 403, whether the input matches the predetermined scenario. The scenario manager may be, for example, a function that can be called in the dispatcher. The step 403 may be performed in a similar way to that described with reference to the step 301.

If it is determined in the step 403 that the input matches the predetermined scenario, a step 405 may be performed in which a thread identifier of the working thread for execution of the processing will be registered.

According to an exemplary implementation, the thread identifier may be registered in a thread table in the memory as global data. Alternatively, the thread identifier may be set as a system property. The thread identifier may be registered with any data structure in any way in response to the determination made in the step 403, as long as the program can access the thread identifier.

In a step 407, the dispatcher sends the input to the working thread and the processing may be executed in the working thread. The processing may comprise one or more points of execution (e.g. point 1, point 2, . . . ). In addition to other operations of the processing, in a step 409, a logging function in which execution information is recorded may also be called at each of at least one of the points of execution.

In a step 411, the logging function may access the thread table to determine whether a thread identifier of the current working thread has been registered in the thread table. According to an exemplary implementation, the logging function may obtain a thread identifier of the current working thread by calling, for example, a system function. If the logging function determines that the thread identifier of the current working thread has been registered in the thread table, it performs, in a step 413, recording of the execution information as logs. If the logging function determines that the thread identifier of the current working thread has not been registered in the thread table, it does not perform recording of the execution information. In other words, the logging function records the execution information at least partially in response to the determination that the input matches the predetermined scenario (e.g. the thread identifier of the first thread has been registered).

According to exemplary implementations, one or more of the steps 405, 407, 409, 411 and 413 may be applied to the implementation of the step 303.

In a step 415, in response to the completion of the processing executed in the working thread, the thread identifier of the working thread may be de-registered from the thread table. In this way, the registering status of the thread identifier may be reset and the repetitive use of the thread identifier may be facilitated without affecting determination of the scenario in reusing the working thread for a next input.

According to an exemplary implementation, in a step 417, a user such as a developer or a tester may access the scenario manager to set or modify the definition of the predetermined scenario. For example, the user may modify an existing predetermined scenario, may add a new parallel predetermined scenario, and/or may remove a parallel predetermined scenario.

According to an exemplary implementation, it is possible that the processing may comprise execution of functions, but parameters of the functions might not comprise all elements of the input. Therefore, it might be difficult to determine whether the input matches the predetermined scenario inside the functions. The use of registering status of a thread identifier of a current working thread to indicate whether the input matches the predetermined scenario may well solve such an issue, because it would be easy for any function to obtain a current working thread and to access a thread table which is a global data.

According to an exemplary implementation, it is possible that a plurality of working threads work in parallel in response to different inputs. For example, processing executed in response to a first input may be in one thread and processing executed in response to a second input may be in another thread. By virtue of the exemplary implementation described with reference to FIG. 4, since a thread identifier is unique for a time duration in which the execution of the processing is in progress, even logging functions at the same points of execution of the program in different threads may be enabled or disabled respectively depending on whether the input to the respective thread matches the predetermined scenario, without affecting the recording of logs in other threads.

Although it has been described with reference to FIG. 4 that the dispatcher may call the scenario manager and may register the thread identifier of the working thread if the input matches the scenario manager, the implementation is not limited thereto. It is also possible that the working thread instead of the dispatcher may call the scenario manager and may register the thread identifier of the working thread if the input matches the scenario manager, at the beginning of the working thread. It is also possible that the working thread instead of the dispatcher may de-register the thread identifier of the working thread, at the end of the working thread.

Although the use of registering status of a thread identifier of a current working thread has been described, it is worth noting that any other identifier may replace the thread identifier, as long as the identifier is associated with the execution of the at least part of the program in response to the input. For example, a value of a global variable may increment each time a new input is received, and may be assigned to a parameter of the at least part of the program as an identifier associated with the execution in response to the input. In this way, the identifier associated with the execution of the at least part of the program in response to the input may be registered at least partially in response to the determination that the input matches the predetermined scenario, and the execution information of the execution of the at least part of the program may be recorded at least partially in response to a determination that the identifier associated with the execution of the at least part of the program in response to the input has been registered. Similarly, the identifier may be registered in an identifier table as a global data.

According to an exemplary implementation, the program may comprise at least a part executed in a first thread and at least another part executed in a second thread, both of which are executed in direct or indirect response to a same input. In the following, execution of the at least part of the program in the first thread will be referred to as "first processing", and execution of the at least another part of the program in the second thread will be referred to as "second processing". According to an exemplary implementation, the first processing and the second processing may be executed in succession. The first processing may generate, for the second thread, a message comprising at least information indicating whether execution information of the second processing should be recorded. By obtaining the information from the message, the second processing may register a thread identifier of the second thread at least partially in response to the determination that the information included in the message indicates that execution information of the second processing should be recorded, and may record the execution information of the second processing at least partially in response to the determination that the thread identifier of the second thread has been registered.

An example of an exemplary implementation in which two or more working threads are used to process a same input will be described with reference to the schematic view shown in FIG. 5. It is to be noted that the example described with reference to FIG. 5 is only for the purpose of facilitating understanding of the exemplary implementation, and intends in no way to limit the scope of the invention.

Figure 5:
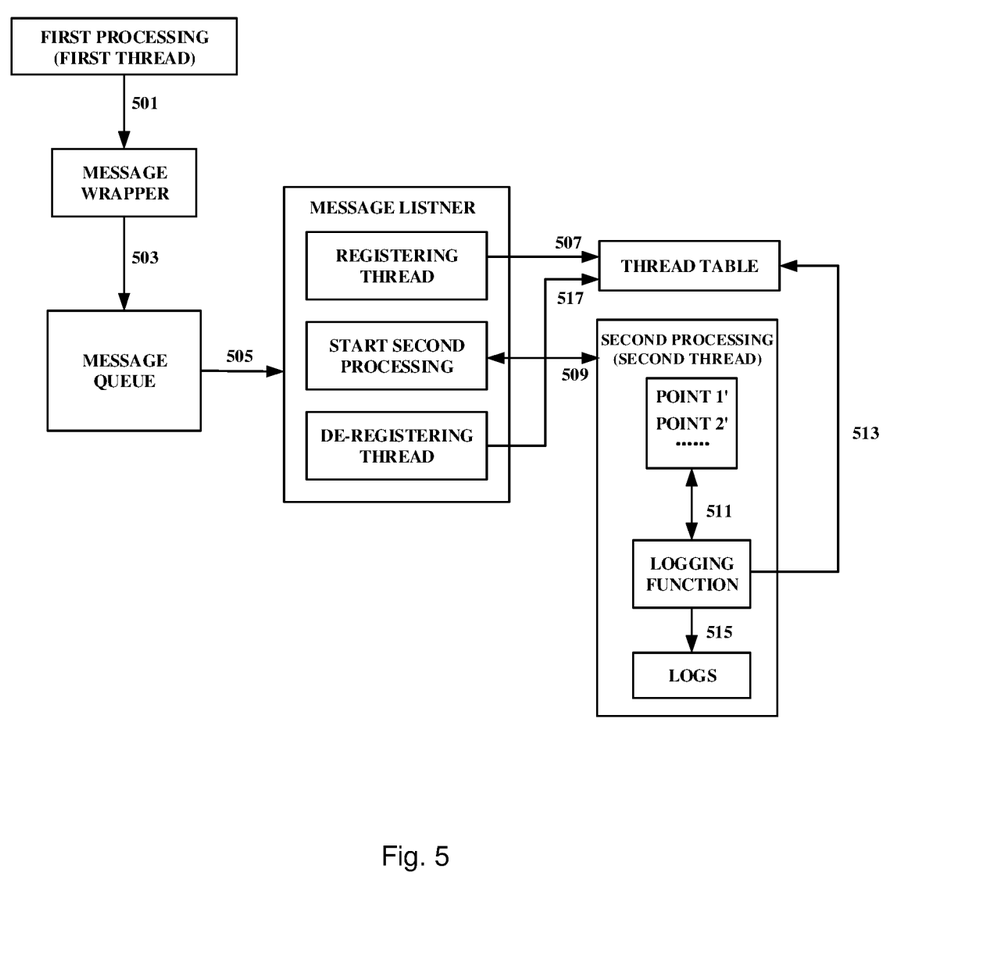
FIG. 5 is a schematic view illustrating an example of an exemplary implementation of the method according to the exemplary implementation of the present disclosure in which two or more working threads are used in response to an input.

As shown in FIG. 5, in a step 501, the first processing may generate a message by using a message wrapper which may be a program for generating a message. The first processing may be, for example, the processing in the working thread as shown in FIG. 4.

The message may comprise at least information indicating whether execution information of the second processing should be recorded. For example, the information may reflect whether the input matches the predetermined scenario. For example, the information may comprise a Boolean value indicating whether a thread identifier of the first thread has been registered in the thread table, and the information indicates that the execution information of the second processing should be recorded if the Boolean value indicates that the thread identifier of the first thread has been registered in the thread table. According to an exemplary implementation, the message may further comprise a value that is necessary for execution of the second processing, and the value may comprise, for example, a result of execution of the first processing, an intermediate value generated during the first processing, and/or at least part of the input to the first processing. According to an exemplary implementation, the message may further comprise information indicating which computation logic should be executed in the second thread.

According to an exemplary implementation, the thread table shown in FIG. 5 may be the same thread table as that shown in FIG. 4. In other words, it is possible that the thread table is shared among different threads.

According to an exemplary implementation, in a step 503, the message wrapper may send the message to a message queue in which a plurality of messages may wait for processing by a message listener, and in a step 505, the message listener may listen to the messages waiting in the message queue, and extract data and/or information from the message. According to an exemplary implementation, the listener may be a program executed in a predetermined thread. The listener may be similar to the dispatcher except for that the listener listens to the message from the massage queue. For example, the listener may be configured to determine a working thread as the second thread for the second processing to be executed. The second thread may already exist or may be newly established in response to the message.

If the information in the message indicates that an execution status of the second processing should be recorded, a step 507 may be performed in which a thread identifier of the second thread is registered in the thread table.

In a step 509, the message listener sends necessary data to the second thread to start the second processing. The second processing may comprise one or more points of execution (e.g. point 1', point 2', . . . ). In addition to other operations of the second processing, in a step 511, a logging function in which execution information is recorded may also be called at each of at least one of the points of execution.

In a step 513, the logging function may access the thread table to determine whether a thread identifier of the current thread has been registered in the thread table. According to an exemplary implementation, the logging function may obtain a thread identifier of the current working thread (the second thread, in this case) by calling, for example, a system function. If the logging function determines that the thread identifier of the current thread (the second thread, in this example) has been registered in the thread table, it performs, in a step 515, recording of the execution information as logs. If the logging function determines that the thread identifier of the current thread (the second thread, in this example) has not been registered in the thread table, it does not perform recording of the execution information.

In a step 517, in response to the completion of the second processing executed in the second thread, the thread identifier of the second thread may be de-registered from the thread table.

Although it has been described with reference to FIG. 5 that the listener may determine whether the information contained in the message indicates whether execution information of the second processing should be recorded, and the listener may register the thread identifier of the working thread in response to the determination, the implementation is not limited thereto. It is also possible that the second thread instead of the listener may perform the determination and may register the thread identifier of the second thread in response to the determination, at the beginning of the working thread. It is also possible that the second thread instead of the listener may de-register the thread identifier of the second thread, at the end of the working thread.

Although the first processing in the first thread and the second processing in the second thread have been described, it is possible that the second processing may send a similar message further to a third processing in a third thread, and similar processes may be performed by the third thread.

By virtue of the exemplary implementation described with reference to FIG. 5, a thread may notify another thread of information reflecting whether the input matches the predetermined scenario. In this way, even if multiple threads are used to process a same input, whether execution information in these threads will be recorded may each depend on whether the input matches the predetermined scenario.

Although FIGS. 4 and 5 show that the logging function determines whether the thread identifier of the current working thread has been registered in the thread table, it is also possible that the determination may be made outside the logging function. In other words, it is also possible to determine whether the thread identifier of the current working thread has been registered in the thread table, and the logging function may be called only if the thread identifier of the current working thread has been registered in the thread table.

In the above, exemplary implementations of the method in FIG. 3 have been described with reference to FIGS. 4 and 5 in which whether the input matches a predetermined scenario is indicated by whether a thread identifier of a thread of processing executed in response to the input is registered in a thread table. However, the method according to the present disclosure is not limited to such a solution, and it is also possible to indicate whether the input matches a predetermined scenario by using other ways.

For example, According to another exemplary implementation, the step 303 may comprise executing at least one of one or more functions included in the program, wherein a parameter indicating whether an input matches a predetermined scenario is set for the at least one of the one or more functions, and recording, at least partially in response to a determination that the parameter indicates that the input matches the predetermined scenario, the execution information of the at least one of the one or more functions.

An example of the exemplary implementation will be described with reference to FIG. 6 which illustrates an exemplary pseudo-code illustrating the exemplary implementation.

Figure 6:
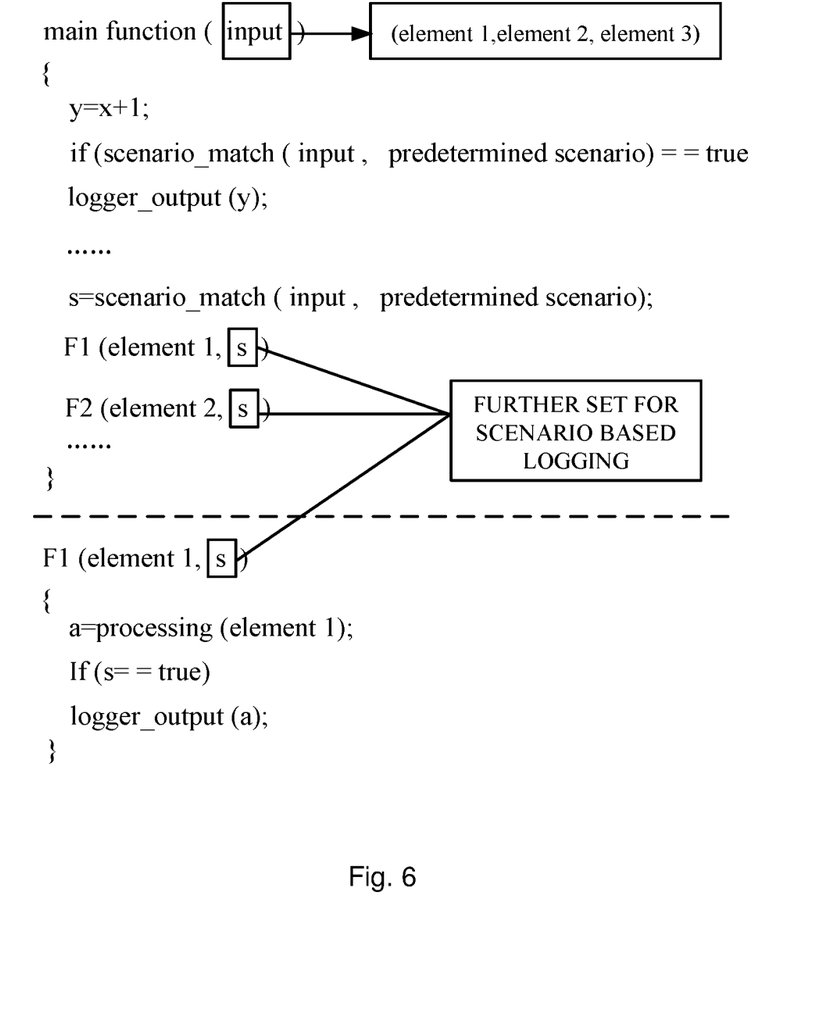
FIG. 6 shows an exemplary pseudo-code illustrating an exemplary implementation of the method according to the exemplary implementation of the present disclosure.

As shown in FIG. 6, at least part of a program including an operation of "y=x+1" and functions "F1" and "F2" is to be executed. Examples of the functions "F1" and "F2" may be the functions shown in FIG. 2.

The function "scenario_match" shown in FIG. 6 determines whether the input matches a predetermined scenario according to, for example, the step 301 as has been described in the foregoing. For example, the function "scenario_match" returns a Boolean value representing "true" if it is determined that the input matches the predetermined scenario. As for the operation of "y=x+1", it is possible to directly determine whether the scenario_match returns a value "true", and recording of execution information of the operation (e.g. the function "logger_output (y)") may be enabled if it is determined that the function "scenario_match" returns a value "true".

As for the functions "F1" and "F2", although the input may comprise multiple elements (e.g. element 1, element 2 and element 3), since the functions to be executed in response to the input might not necessarily use all the elements as parameters (e.g. the function "F1" only uses the element 1 as its parameter), it may be difficult to call the function "scenario_match" inside the functions. In consideration of this, a parameter "s" may be set and may be assigned with a return value of the function "scenario_match", and the parameter "s" may be set as a further parameter of each of the functions "F1" and "F2".

Taking the function "F1" for example, in executing the function "F1", it is determined whether the value of the parameter "s" is a value representing "true" (which indicates that the input matches the predetermined scenario), and a function of recording the execution information (for example, an intermediate variable "a") of the function "F1", such as the function "logger_output (a)", may be executed if the parameter "s" is a value representing "true".

For other functions such as the function "F2", operations similar to those described for the function "F1" may be performed.

The setting of the parameter (such as the parameter "s") and/or the setting of the conditional statement (such as the "if" statement) for the recording of the execution information may be performed by a user such as a developer or a tester, or may alternatively be performed by a compiler program. In other words, a user or a compiler program may insert, into the original program, a code for setting the parameter and a code for setting the conditional statement (such as the "if" statement) for the recording of the execution information.

It is to be noted that the exemplary pseudo-code shown in FIG. 6 is only an example for the purpose of facilitating understanding of the exemplary implementation, and intends in no way to limit the scope of the invention.

Although FIG. 6 shows that whether the parameter "s" is true is determined outside the logging function, it is also possible that the parameter "s" is also set for the logging function so that the logging function may become "logger_output (a, s)", and the determination may be made inside the logging function instead. In other words, it is also possible that the logging function is always called, but execution information may be recorded only if the logging function determines that the value of the parameter "s" indicates "true".

According to some exemplary implementations, the conditions to enable recording of the execution information (logging) according to the present disclosure may function together with other conditions depending on other factors. The other factor may include, for example, the level of the logs. For example, it is possible to enable logging on the condition that the input matches the predetermined scenario and at the same time the level of the log matches the level required by the user.

The recording of execution information of execution of at least part of a program based on a scenario that is determined from the input of the program, which may also be referred to as "scenario based logging", may enable a user such as a developer or a tester to record execution information only for desired application scenarios during debugging. Thereby, it is possible to reduce I/O operation which is caused by excessive logging operations, and also possible to reduce disk space for storing excessive logging files. The method according to the present disclosure may also improve user experience because the execution information to be recorded may be designated in a simple and flexible way.

The method and implementations proposed in the present disclosure may also be implemented in a Cloud environment in which various application scenarios corresponding to various kinds of inputs are usually presented.

The present disclosure may be used with any programming language, such as, for example but without limitation, C, C++ and Java. In addition, the present disclosure may be used with any developing tools such as, for example but without limitation, eclipse, visual studio and android studio.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method comprising:
    determining whether an input to a program matches a predetermined scenario, wherein the input comprises at least one element selected by an input device and the predetermined scenario comprises at least one condition related to the at least one element of the input;
    registering, at least partially in response to the determination that the input matches the predetermined scenario, a thread identifier of a first working thread in which the at least part of the program is executed, wherein the input matched is from execution of the program in progress; and
    recording, at least partially in response to a determination that the thread identifier of the first working thread has been registered, execution information of execution of at least part of the program, the execution of the at least part of the program being in response to the input.

2. The computer implemented method according to claim 1, wherein:
    the execution of the at least part of the program comprises one or more points of execution, and a logging function for recording execution information is provided for at least one of the one or more points of execution, wherein the one or more points of execution indicate execution until a certain line of source code is reached.

3. The computer implemented method according to claim 1, further comprising:
    de-registering the thread identifier of the first working thread in response to completion of the execution of the at least part of the program.

4. The computer implemented method according to claim 1, further comprising:
    generating, for a second working thread, a message comprising at least information indicating whether execution information of execution of at least another part of the program should be recorded, wherein the at least another part of the program is to be executed in the second working thread.

5. The computer implemented method according to claim 4, further comprising:
    registering, at least partially in response to the determination that the information indicates that execution information of execution of the at least another part of the program should be recorded, a thread identifier of the second working thread; and
    recording, at least partially in response to the determination that the thread identifier of the second working thread has been registered, the execution information of the execution of at least another part of the program.

6. The computer implemented method according to claim 1, wherein the recording comprises:
   executing at least one of one or more functions included in the program, wherein a parameter indicating whether an input matches a predetermined scenario is set for the at least one of the one or more functions; and
   recording, at least partially in response to a determination that the parameter indicates that the input matches the predetermined scenario, the execution information of the at least one of the one or more functions.

* * * * *